C. M. DALY.
COOKING UTENSIL.
APPLICATION FILED SEPT. 6, 1912.
1,084,402.
Patented Jan. 13, 1914.
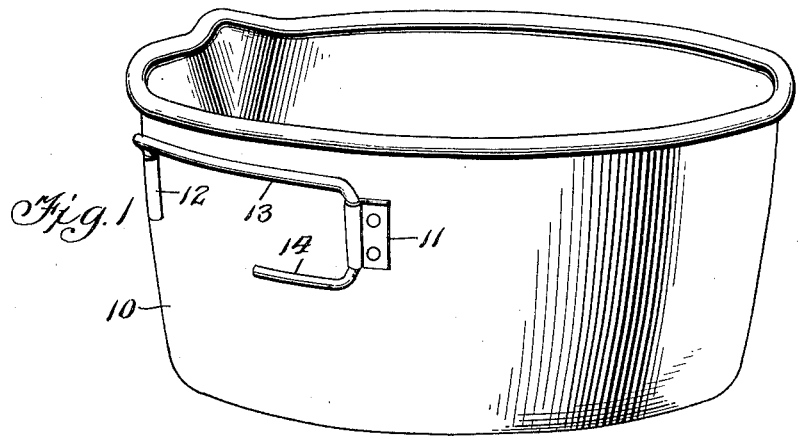
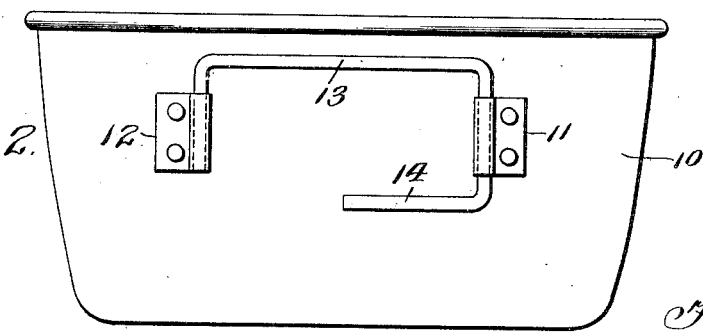
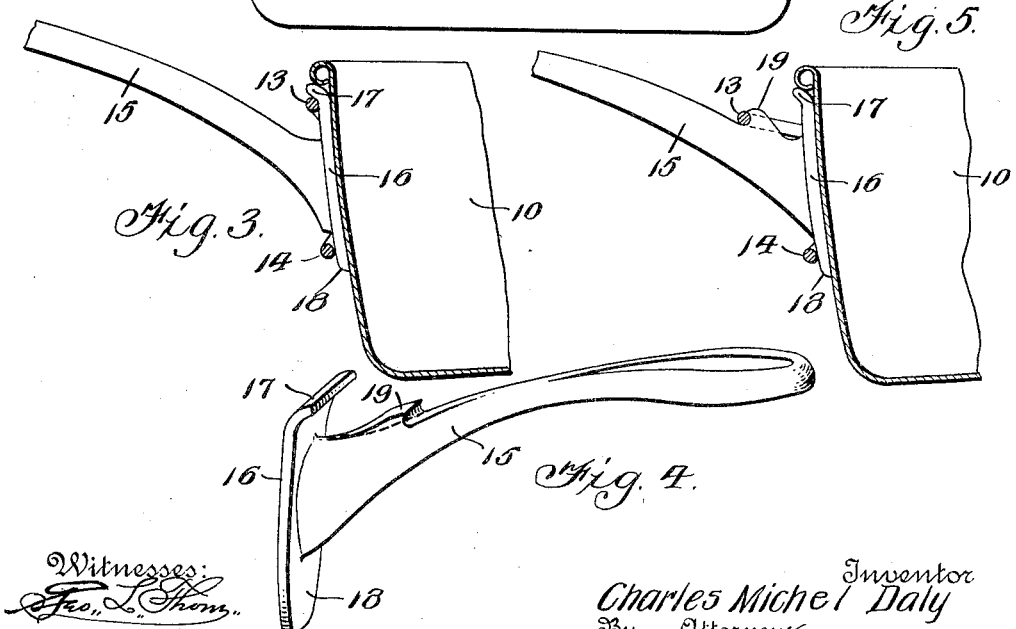
Witnesses:
Geo. L. Thom.
B. A. Hanway.
Inventor
Charles Michel Daly
By Attorneys
Mason Fenwick & Lawrence

UNITED STATES PATENT OFFICE.

CHARLES MICHEL DALY, OF EAST ELMHURST, NEW YORK.

COOKING UTENSIL.

1,084,402.  Specification of Letters Patent.  Patented Jan. 13, 1914.

Application filed September 6, 1912. Serial No. 718,916.

*To all whom it may concern:*

Be it known that I, CHARLES MICHEL DALY, a citizen of the United States of America, residing at East Elmhurst, in the county of Queens and State of New York, have invented certain new and useful Improvements in Cooking Utensils; and I do hereby declare the following to be a full, clear, and exact description of the invention, such as will enable others skilled in the art to which it appertains to make and use the same.

This invention relates to cooking utensils and more particularly to that type having detachable handles.

An object of this invention is to provide means for gripping a utensil with a detachable handle and for locking said handle to said utensil by a circumferential movement of said handle with respect to said utensil.

A further object of this invention is to provide cooking utensils of the common type with a fixture which may receive a detachable handle and lock the same to the utensil.

A further object is to provide a fixture which is secured to a utensil which may serve as a handle for the utensil when cold or which may receive a detachable handle as in removing a utensil from a heated stove or the like.

Further objects will be apparent from the following specification, appended claims and drawings, in which, Figure 1 is a perspective view of the utensil equipped with this device, Fig. 2 is an elevation thereof, Fig. 3 is a vertical sectional view therethrough, Fig. 4 is a perspective view of the handle removed, and, Fig. 5 is a sectional view of a modified form.

In cooking utensils it has proven quite difficult to provide means for keeping the handles of the utensils while on the stove from getting hot so that the utensil may be readily removed from the stove when desired, and so in departing from the idea of providing cold handle utensils, I provide utensils of the common type having removable or detachable handles which handles may be made of a standard type so as to be assembled with any style of cooking utensil by making the utensil devoid of a projecting handle and, it is apparent that convenience in storing is benefited and as one handle may serve for a complete line of utensils a great saving and convenience is resultant.

Referring to the drawings, 10 indicates a utensil which may be of any design or configuration and secured thereto are the bracket members 11 and 12 which may be secured as by soldering or riveting. Secured within the brackets 11 and 12 is a curved guard 13 which conforms with the curvature of the utensil and the ends of said guard are bent in the direction of the utensil and then down to a parallel relation with the walls of the utensil when they are secured within the clips 11 and 13. One of the ends extends below the clip and is bent as at 14 so as to provide a space between the walls of the utensil and said curved portion to be hereinafter described.

I provide a detachable handle or lifter 15 which has a shield 16 secured to the end thereof, this shield extends above the point of junction between the handle and said shield as at 17 where it is curved as clearly shown in Fig. 3 and in Fig. 4 of the drawing. A tongue 18 also extends below the junction with the handle as shown in the drawings, and when it is desired to remove a utensil from the stove or the like, the handle is brought into relation with the utensil so as to cause the curved end 17 to engage the inside of the curved guard 13 and to allow the shield 16 to bear against the wall of the utensil, when the handle and shield may be moved circumferentially with respect to the utensil, and when the tongue 18 will engage under the curved end 14, whereupon the handle is locked with respect to the utensil.

In Fig. 5 of the drawings, I have shown a slightly modified form of this invention wherein the curved guard 13 is spaced farther from the utensil than in Figs. 1, 2 and 3, so that the same may serve as a handle when the utensil is not hot. To accommodate this construction the handle or lifter 15 is provided with the lug 19 in addition to the usual construction.

It is apparent from the foregoing as to how the handle is applied and removed and I do not restrict myself to the identical form shown as several modifications may be made within the scope of the following claim and

Having thus described my invention, I claim:

In a cooking utensil, a fastening means secured to the exterior wall thereof, a handle removably secured to said fastening means, said fastening means comprising a continuous piece of metal to present a long curved section having depending ends, and one of said depending ends being bent to parallel relation with said longer curved portion, said depending ends being secured to the wall of the utensil and said handle having a shield formed thereon, said shield having a curved upper edge and a plain lower end.

In testimony whereof I affix my signature in presence of two witnesses.

CHARLES MICHEL DALY.

Witnesses:
 LOUIS LEVIEN,
 HUGO MOCK.

---

Copies of this patent may be obtained for five cents each, by addressing the "Commissioner of Patents, Washington, D. C."